(12) United States Patent
Casteras

(10) Patent No.: US 8,999,474 B2
(45) Date of Patent: Apr. 7, 2015

(54) DEVICE COMPRISING AT LEAST ONE BUILT-IN COMPOSITE MATERIAL HINGE HAVING AN UNINTERRUPTED CONNECTING REINFORCEMENT

(75) Inventor: Christophe Casteras, Toulouse (FR)

(73) Assignee: Centre National d'Etudes Spatiales (CNES), Paris (FR)

( * ) Notice: Subject to any disclaimer, the term of this patent is extended or adjusted under 35 U.S.C. 154(b) by 402 days.

(21) Appl. No.: 13/120,979

(22) PCT Filed: Sep. 24, 2009

(86) PCT No.: PCT/FR2009/051817
§ 371 (c)(1),
(2), (4) Date: Mar. 25, 2011

(87) PCT Pub. No.: WO2010/034946
PCT Pub. Date: Apr. 1, 2010

(65) Prior Publication Data
US 2011/0177279 A1    Jul. 21, 2011

(30) Foreign Application Priority Data

Sep. 26, 2008   (FR) ..................... 08 05302

(51) Int. Cl.
*E05F 1/12* (2006.01)
*E05D 1/02* (2006.01)
*E05D 11/06* (2006.01)
(Continued)

(52) U.S. Cl.
CPC ............... *E05D 1/02* (2013.01); *A45C 13/005* (2013.01); *E05D 11/06* (2013.01); *B29C 53/066* (2013.01); *E05F 1/12* (2013.01); *B64G 1/222* (2013.01); *E05D 9/005* (2013.01); *E05Y 2800/205* (2013.01)

(58) Field of Classification Search
CPC ............ A45C 13/007; E05F 1/12; E05F 1/14; E05D 1/02; E05D 9/005
USPC ......................................... 403/157, 221, 223
See application file for complete search history.

(56) References Cited

U.S. PATENT DOCUMENTS 4,387,128 A * 6/1983 Emms et al. .................. 428/121
4,438,605 A * 3/1984 DeLucia ........................... 52/71
(Continued)

FOREIGN PATENT DOCUMENTS

DE      4224699 A1    1/1994
EP      1085152 A2    3/2001
(Continued)

OTHER PUBLICATIONS

International Search Report, dated Jan. 22, 2010, from the corresponding PCT application.

*Primary Examiner* — David Sample
*Assistant Examiner* — Donald M Flores, Jr.
(74) *Attorney, Agent, or Firm* — Young & Thompson

(57) ABSTRACT

A device includes at least one built-in flexible portion (1) between two stiffer portions (10) that are made of a stiff composite material, the flexible portion (11) being suitable for forming a flexible hinge and made of a flexible material including a reinforcing armature that includes at least one connecting layer (13) common to the material(s) forming each stiff portion (10). The device has end surfaces (20) that oppose each other when extended, the opposing end surfaces being arranged to be suited to serve as a longitudinal compression abutment while enabling the thus-made hinge to fold back at least in a direction away from the extended state.

18 Claims, 7 Drawing Sheets

(51) Int. Cl.
*A45C 13/00* (2006.01)
*B64G 1/22* (2006.01)
*B29C 53/06* (2006.01)
*E05D 9/00* (2006.01)

(56) References Cited

U.S. PATENT DOCUMENTS 4,463,046 A * 7/1984 Hutchison et al. ............ 428/156
4,476,174 A * 10/1984 Carrera .......................... 428/67
5,350,614 A * 9/1994 Chase et al. .................... 428/53
5,445,471 A 8/1995 Wexler et al.
7,354,033 B1 * 4/2008 Murphey et al. .............. 267/160
7,582,345 B2 * 9/2009 Priegelmeir et al. ............ 428/60
2002/0038684 A1 * 4/2002 Puppin .......................... 156/88

FOREIGN PATENT DOCUMENTS

FR 1382678 A 3/1965
FR 2908366 A1 5/2008

* cited by examiner

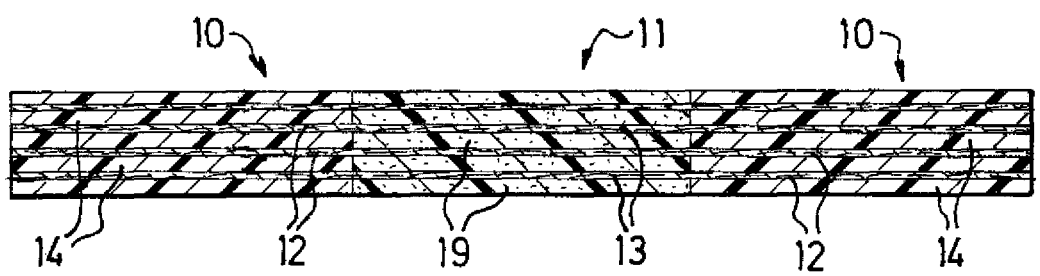
Fig 1a
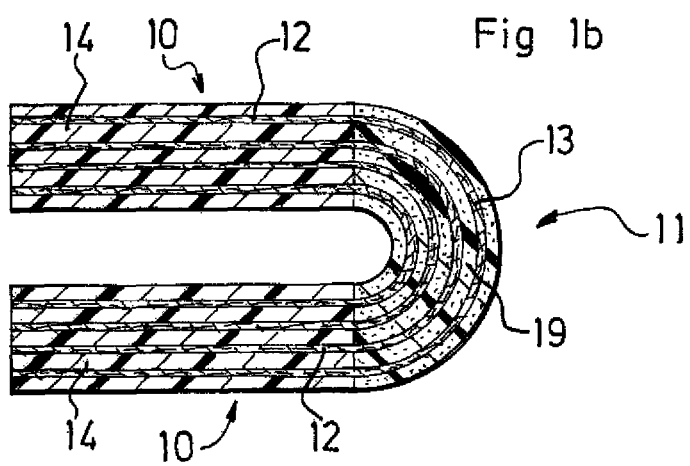
Fig 1b
Fig 1c
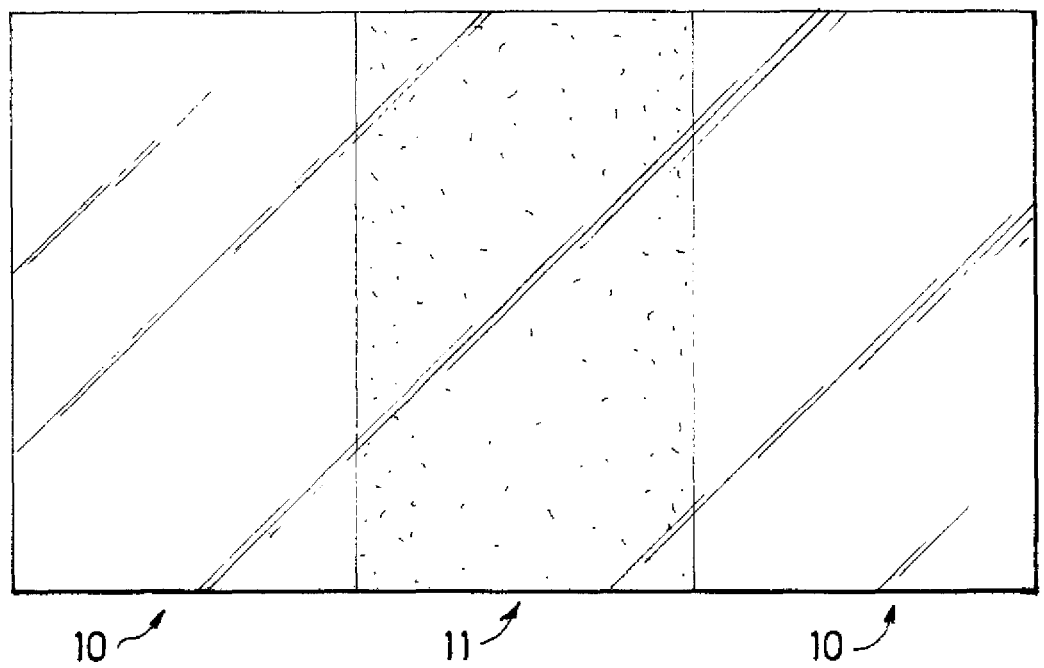

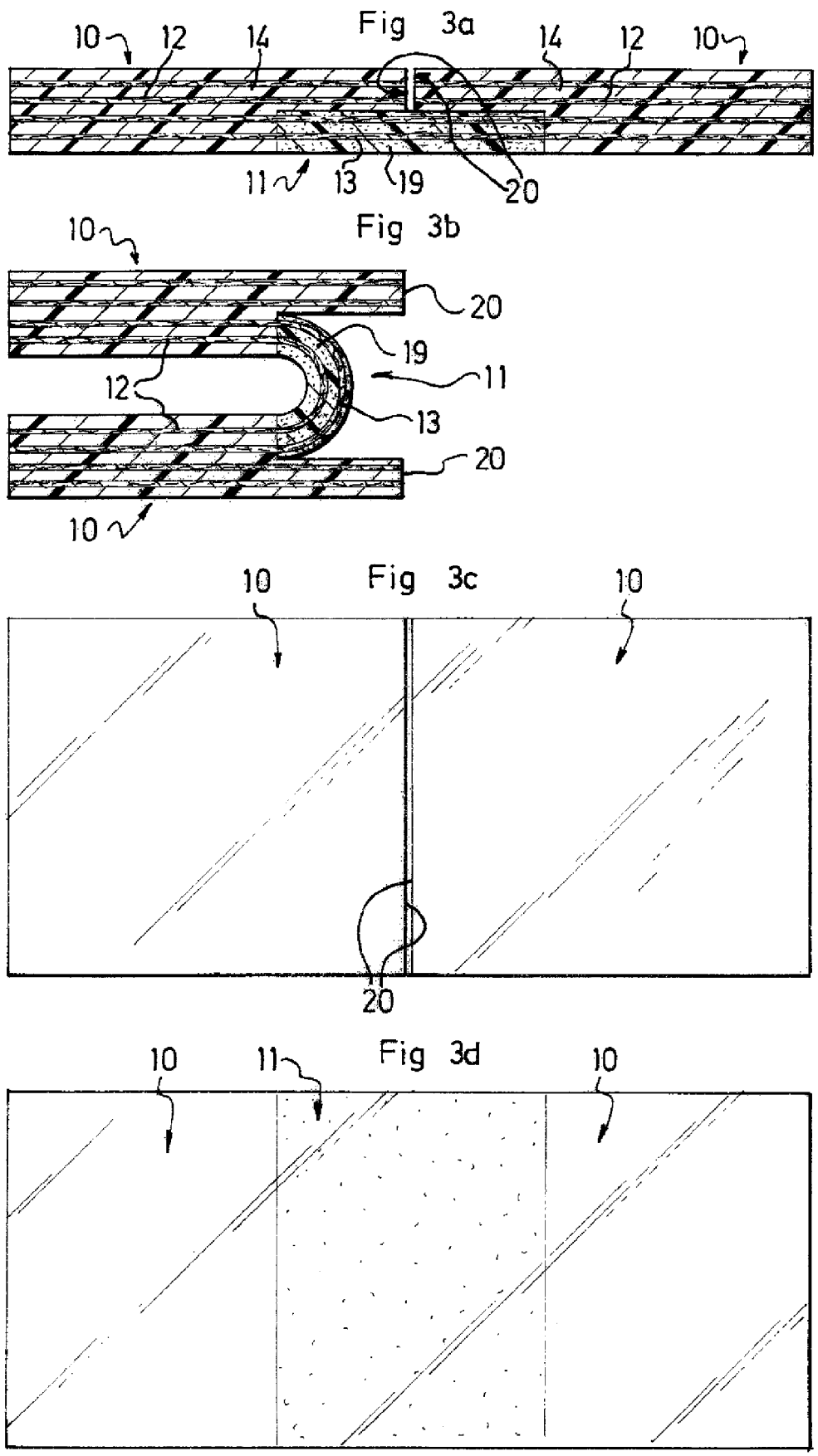

DEVICE COMPRISING AT LEAST ONE BUILT-IN COMPOSITE MATERIAL HINGE HAVING AN UNINTERRUPTED CONNECTING REINFORCEMENT

The invention relates to a device comprising at least one non-articulated built-in hinge comprising at least one flexible portion which is built in between two portions, named stiff portions, which are stiffer than each flexible portion, at least in flexure around an axis which is parallel to, or combined with, a theoretical axis of pivoting of the hinge thus formed. Each stiff portion is made of composite material, named stiff composite material, with each flexible portion connecting the said stiff portions.

Throughout the text, "composite material" means any heterogeneous synthetic solid material comprising at least one reinforcement structure, which is formed by at least a first material, and is designed to confer mainly properties of mechanical strength on the said composite material, this reinforcement structure being associated with at least one other part, named the matrix, which is made of at least a second, polymer material, with mechanical properties which are different from those of the reinforcement structure. In particular, this expression covers the composite materials which are traditionally constituted by a reinforcement structure made of sheets, strips or fabrics of fibers (the purpose of which is to transmit the stresses, at least the longitudinal traction stresses (in the direction of the fibers), and in general also the longitudinal compression stresses), this reinforcement structure being embedded in a matrix of polymer material (the purpose of which is to confer the general form and dimensions of the material, to support the reinforcement structure, and to provide transverse compression resistance (at right-angles to the fibers of the reinforcement structure)). But it also designates in particular the multiple-layer materials (such as those which are traditionally classified as complex or stratified), for example comprising a central core (formed by one or more layers, which for example are made of metal(s), and/or of synthetic material which is stiff in traction), which serves as a reinforcement structure which can transmit stresses at least in longitudinal traction (in any direction parallel to the plane of each layer which constitutes this core), and is interposed between two thicknesses (themselves each formed by one or more layers) of polymer materials, these two thicknesses serving as a matrix.

Built-in non-articulated hinges, for example of the so-called film-hinge type, have been known for a long time, and form the basis of many applications, in particular in the field of packaging. In general, they consist of a local reduction in thickness of a material which is resilient in flexure, thus making it possible to form a more flexible portion between two stiffer portions of this material.

Known hinges of this type do not have sufficient mechanical characteristics in certain applications, for example in the domain of space. In addition, they are generally reserved for the use of a homogeneous thermoplastic synthetic material.

U.S. Pat. No. 7,354,033 describes a device which forms a non-articulated resilient monolithic hinge between two portions of a flat or curved (tiled) strip of the "carpenter's joint" type, forming a spring which may be made of spring steel, cupro-beryllium alloy, or one composite material or another. According to a first embodiment, the hinge is formed by a portion made of a second material which is more flexible than that which forms the spring strip, for example an alloy with form memory, a steel, or a copper-beryllium alloy. According to a second embodiment, the hinge is formed by a portion which is constituted by the same material as that of the strip which forms the spring, but with a smaller thickness, in the manner of film hinges. The third embodiment is similar to the second, and in addition has lateral reinforcements which are made of form-memory alloy.

The first embodiment poses the problem of reliable production of the joint between the portion which forms the hinge, and the portions which form the strip. In fact, at this joint, the discontinuity of materials necessarily gives rise to risks of failure and manufacturing difficulties. In particular, in the aeronautical domain and the domain of space, the reliability of a joint of this type and its resistance to mechanical, thermo-mechanical and vibratory stresses in the long term, is difficult to guarantee.

The other embodiments involving reduction of thickness are limited to the use of a composite material which is compatible with the flexibility which is expected at the portion which forms a hinge with a reduced thickness. In particular, it is not possible to use a composite material, the matrix of which is stiff and/or has low deformation before rupture (taking into account the flexure deformation which is necessary at the radius of curvature), or which is inflexible or fragile, for example which is made of polymethacrylate or ceramic. Furthermore, contrary to what the document in question indicates, it is in fact impossible to produce a hinge of this type which can be folded and unfolded several times with small radii of curvature, without rupture taking place.

Finally, the known non-articulated hinges all have the disadvantage that, taking into account the necessary presence of a built-in flexible portion between two stiffer portions, it provides only mediocre longitudinal traction or compression resistance when extended.

The object of the invention is to eliminate these disadvantages.

The object of the invention is thus in particular to propose a device comprising at least one non-articulated built-in hinge between stiff portions which can be made of any composite material, including with a matrix which is inflexible, at least according to a certain direction/certain directions, the hinge being able to have properties which are suitable for the application envisaged, being simple to manufacture, and having a perfectly reliable joint between the flexible portion which forms the hinge, and the stiffer portions which the hinge connects.

The object of the invention is also to propose a device of this type which can form the basis of numerous variant embodiments, and is compatible with many applications, including the aeronautical domain and the domain of space. The object of the invention is also to propose a device of this type which, furthermore, can be produced such as to provide improved longitudinal compression resistance when extended.

The object of the invention is also to propose a device of this type which can be compatible with a certain flexibility in flexure of the said stiff and/or hinge portions thus formed, on a flexure plane which contains the theoretical axis of pivoting of the hinge, or parallel to this axis, i.e. around axes of flexure which are at right-angles to the axis of the hinge.

More particularly, the object of the invention is to propose a device of this type which can be produced with some or all of the following properties:
  angular amplitude of clearance of the hinge of 0° to 180°, or even up to 360°;
  possibility of providing an abutment which limits the opening of the hinge in a direction starting from a certain angle;

hinge which has a certain flexibility of its theoretical axis of pivoting, and which in particular makes it possible to connect curved spring strips of the "carpenter's joint" type;

each flexible portion which forms a hinge having, in flexure around the theoretical axis of pivoting of the hinge, flexibility which is at least substantially greater than that of the stiff portions;

decrease in, or lack of, play during functioning;

continuity of the stiffness and longitudinal mechanical resistance in traction, when extended;

continuity of the stiffness and longitudinal mechanical resistance in compression, when extended;

absence of friction;

fatigue resistance to repeated folding and unfolding with small radii of curvature;

simplicity of manufacture;

minimum weight;

minimum dimensions, in particular in the direction of the thickness (reduced radius of folding and reduced excess thicknesses);

reduced manufacturing cost.

For this purpose, the invention relates to a device comprising at least one flexible portion which is built in between two portions, named stiff portions, which are stiffer than each flexible portion (at least in flexure around an axis which is parallel to, or combined with, a theoretical axis of pivoting of the hinge thus formed; but which can be flexible on a flexure plane, named the transverse plane, which is parallel to the theoretical axis of pivoting of the hinge, and does not pass via this axis), each stiff portion being made of composite material, named stiff composite material, the said flexible portion connecting the said stiff portions and being designed to form a flexible hinge between the stiff portions, each stiff portion comprising at least one structure to reinforce the stiff composite material which constitutes it, which can impart resistance at least in longitudinal traction (in general thus determining the resistance in longitudinal compression and traction) to this stiff composite material, and a matrix within which the reinforcement structure extends, each flexible portion being formed:

by a material, named flexible material, selected from the group formed by the materials, named flexible complex materials, comprising:

a reinforcing armature comprising at least one layer, named the connection layer, of a reinforcement structure which is common to the stiff composite material(s) which form(s) each stiff portion, each connection layer extending continuously and in common between the said stiff portions, and being designed to be able to be flexible;

a matrix within which the reinforcing armature extends, this matrix itself being formed by a material which is more flexible in flexure than that which constitutes a matrix of stiff composite material of each stiff portion;

by at least one connection layer of a reinforcement structure which is common to the stiff composite material(s) which form(s) each stiff portion, with each connection layer extending continuously and in common between the said stiff portions, and being designed to be able to be flexible (the said flexible material, and thus the flexible portion consisting of this material then being constituted exclusively by one or more layer(s) of the reinforcement structures of the stiff portions which serve as connection layer(s), and are without a matrix), wherein it has end surfaces that oppose each other when in an extended state, and the stiff portions and each flexible portion are in the extension of one another, said opposing end surfaces being arranged in the extended state to be suited to serve as a longitudinal compression abutment, whilst enabling the hinge thus formed to fold back, at least in a direction away from the extended state.

According to a variant of the invention, the said opposite end surfaces are designed to make it possible to block the device in the extended state, whilst preventing the folding back of the hinge in one direction, and permitting the folding back of the hinge only in the other direction. According to another variant of the invention, the said opposite end surfaces are designed to permit folding back of the hinge in both directions.

Thus, in a device according to the invention, the production and integration of at least one flexible portion which forms a hinge between the two stiff portions is particularly simple and reliable, the connection between these different portions being assured by each connection layer of the additional reinforcement. In addition, the matrix of the flexible portion can be designed to have mechanical properties which are appropriate according to the application, in a manner which is totally independent from the stiff composite material(s) which constitute(s) the stiff portions. It is thus possible in particular to vary the properties of resilience (in particular by selecting a material with an appropriate Young's modulus), and the dimensions and ranges of deformations permissible for each flexible portion. In particular, it is possible to control perfectly, and in particular to minimize, the flexure stresses of the hinge thus obtained. In addition, the device according to the invention can be designed in such a way as to have a very small dimension, and in particular a small angle of folding (which can be equal to) 0°, and a small radius of curvature of the flexible portion in the curved state. In addition, a device according to the invention can also be designed to be able to transmit torsion forces in the curved state of the hinge, around an axis which is at right-angles to the axis of pivoting of the hinge. Stiffness in torsion of this type in the curved state makes it possible for example to stabilize the device, in particular during launching of a space system in which it is incorporated (for example solar panels which are folded in the form of an accordion).

According to a variant embodiment, in a device according to the invention, the flexible portion can be formed only by said reinforcing armature, formed by one or more connection layer(s), i.e. by one or more layer(s) common to the reinforcement structures of the said stiff composite material(s) of the stiff portions. In this variant embodiment, the said flexible material which constitutes the flexible portion is constituted exclusively by said reinforcing armature, and is therefore without a matrix. The device according to the invention is then constituted by two stiff portions made of composite material(s) connected to one another by at least one common part of their reinforcement structures. This variant is particularly advantageous in the case in which the said stiff parts are formed by composite materials which are constituted by complex multiple layers, for example in the form of a reinforcement structure which constitutes a central core, this reinforcement structure being covered on each of its main surfaces by at least one polymer film. In this case, the flexible portion can be formed solely by a portion of the central core which connects the two stiff portions.

According to another variant of the invention, the said flexible material which forms the said flexible portion also comprises a matrix within which the reinforcing armature extends. The said flexible material is thus then also a flexible composite material. This matrix of the said flexible composite material is formed by a material which is different from the material which constitutes the matrix of each stiff composite material which constitutes each stiff portion. In particular, this matrix of the said flexible composite material is formed by a material which is more flexible in flexure (i.e. with a lower Young's modulus and greater deformation in flexure before rupture) than the material which constitutes the matrix of the stiff composite material of each stiff portion. This matrix of the flexible composite material is flexible in flexure, and is selected, as is the reinforcing armature, such that the said flexible portion is itself flexible in flexure, and forms a built-in hinge which connects the stiff portions.

In addition, advantageously and according to the invention, at least one connection layer has at least one unit which is resistant in traction, and extends longitudinally, continuously, and in an uninterrupted manner, within the said stiff portions and the said flexible portion. Thus, in this advantageous embodiment of the invention, the connection between the two stiff portions is at least partly provided by the said unit, and thus by the corresponding flexible portion itself. Advantageously and according to the invention, the said unit is selected from the group formed by monofilaments, cables, bundles, fabrics, non-woven fabrics, strips, sheets, mats and leaves, and complex multiple layers.

In addition, advantageously and according to the invention, each connection layer is selected from the group formed by sheets of woven synthetic fibers, sheets of non-woven synthetic fibers, which are or are not mono-directional, mats, sheets of woven synthetic strips, sheets of non-woven synthetic strips, leaves of synthetic materials, leaves of metal materials, or multiple-layer complex substances comprising a plurality of layers, with each layer being one of these materials.

In certain advantageous embodiments of a device according to the invention, each connection layer is based on synthetic fibers selected from the group formed by glass fibers; carbon fibers; metal fibers, metal whiskers; boron fibers; beryllium fibers; ceramic fibers ($Al_2O_3$, SiC, $Si_3N_4$, BeO, etc); asbestos fibers; cellulose fibers; polymer fibers; in particular polyamide fibers which are or are not aromatic, polyester fibers, polyethylene fibers which are or are not oriented; PBO fibers: poly(benzoxazole), chlorofibres, acrylic fibers, polypropylene fibers, polyurethane fibers, aramid fibers; and their mixtures.

According to a possible embodiment of a device according to the invention, each layer of the reinforcement structure of the stiff composite material which forms the said stiff portions extends continuously between the stiff portions, such as to form a connection layer. In other words, in this embodiment, all of the reinforcement structure of the stiff composite material(s) is used in order to form, at least partly, the reinforcing armature of a flexible portion.

Reciprocally, in a variant embodiment of a device according to the invention, the reinforcing armature of the flexible material of each flexible portion is constituted solely by at least one connection layer (of the reinforcement structure of the stiff portions). Thus, in the variant in which the flexible material is a flexible composite material, the reinforcement structure of the stiff portions and the reinforcing armature of the flexible composite material are identical, with the stiff and flexible composite materials having a common reinforcement, and only the matrices being different. As a variant however, there is nothing to prevent the reinforcing armature of the flexible composite material which forms a flexible portion comprising at least one additional layer which is specific to it (in other words which does not form part of the reinforcement structure of the stiff composite material), in order to provide the said flexible portion with specific properties.

In addition, advantageously and according to the invention, the said stiff portions and each flexible portion have similar thicknesses. In fact, it is a particular advantage of a device according to the invention to be able to be produced such that each flexible portion has a thickness which is similar to that of the stiff portions, i.e. without needing a reduction in thickness. In particular, advantageously, a device according to the invention is characterized in that the said stiff portions have similar thicknesses, and in that, in the extended state, it has a similar thickness amongst the said stiff portions. Thus, in this embodiment, a device according to the invention has continuity of thickness when extended, amongst the stiff portions.

However, conversely, a device according to the invention can also be produced with a reduction in thickness of each flexible portion, or more generally in the connection between the two stiff portions, if a reduction in thickness of this type is considered to be necessary or advantageous. The mechanical properties of each flexible portion can be adapted easily, irrespective of the thickness required, without being imposed by the mechanical properties of the stiff portions.

According to a variant embodiment of a device according to the invention, only a part of the thickness of the reinforcement structure of the said stiff portions extends continuously between the said stiff portions, such as to serve as a connection layer/connection layers, the other part of the reinforcement structure of the said stiff portions being interrupted between the two stiff portions. In this variant embodiment, advantageously, the stiff parts can be extended towards one another in the part of their thickness where the reinforcement structure is interrupted, such as to have end surfaces that oppose each other when extended, and can form a longitudinal compressed abutment which provides the device with improved resistance in longitudinal compression.

As previously stated, in principle there is no limit concerning the embodiment of the matrix of a flexible composite material of a device according to the invention, since it is adapted to the formation of the said flexible portions which form a hinge. Advantageously and according to the invention, the matrix of the said flexible composite material is selected from the ductile flexible organic matrices which have considerable deformation in flexure at rupture. Advantageously and according to the invention, the matrix of the said flexible composite material is formed by at least one material selected from the group formed by natural rubbers (NR); elastomers (in particular the following elastomers: polyacrylate (ACM), polyesterurethane (AU), bromobutyl rubber(BIIR), polybutadiene (BR), chlorobutyl rubber (CIIR), chlorinated polyethylene (CM), homopolymer of epichlorhydrine (CO), copolymer of polyesteramide (CPA), copolymer of polyester-glycol (CPE), polychloroprene (CR), chlorosulphonated polyethylene (CSM), copolymer of ethylene and methyl acrylate (EAM), copolymer of epichlorhydrine and ethylene oxide (ECO), terpolymer of propylene ethylene and a diene (EPDM), copolymer of ethylene and propylene (EPM), polyetherurethane (EU), copolymer of ethylene and vinyl acetate (EVM or EVA), fluorocarbonated elastomers (FKM and FPM), silicone with methyl and fluorinated groups (FVMQ), copolymer of butadiene and hydrogenated acrylonitrile (H-NBR), butyl rubber (IIR), synthetic polyisoprene (IR), methylsilicone (MQ), copolymer of butadiene and acrylonitrile (NBR), polyether of ethyleneglycol and an acid (OT), methylphenylsilicone (PMQ), polydichlorophosphazenes with substitution of fluorinated groups (PNF), polynorbornene (PNR), polyurethanes (PUR), methylsilicone with phenyl and vinyl groups (PVMQ), silicone rubbers (Q), copolymer of styrene and butadiene (SBR), copolymer-blocks of styrene-butadiene-styrene (SBS), copolymer-blocks of styrene-ethylene-butene (or butylene)-styrene (SEBS), copolymer-blocks of styrene-isoprene-styrene (SIS), synthetic rubbers (SR), polysulphides (TM or T), thermoplastic rubbers (TPE), thermoplastic elastomers derived from polyolefins (TPO), thermoplastic polyurethanes (TPU), methylsilicone with vinyl groups (VMQ), halogenated butyl rubber (XIIR), carboxylated nitrile rubber (XNBR)); polyethylene resins; polystyrene resins; polyethylene foams; polystyrene foams. The material which constitutes the matrix of the said flexible composite material can be made of any other material which fulfils the requirements of flexibility and deformation of the flexible connection to be obtained, and also may or may not be filled with particles which can provide it with any appropriate additional property (for example magnetic, electric, thermal particles, etc). In addition, this material can be in monolithic form, or in the form of a foam, or also in the form of a multiple layer complex substance, or the like.

According to a variant embodiment of the invention, the matrix of the said flexible composite material is a multiple layer complex substance consisting of polymer films selected from the group comprising: polyolefins—in particular polyethylenes, polypropylenes-, acrylics, polyamides which are or are not aromatic, polyimides (Kapton) which are or are not aromatic, polyesters, PBO: poly(benzoxazole), poly(arylene ether benzimidazoles) (TOR), polyurethanes, PVC (polyvinyl chloride).

In addition, in a device according to the invention, a flexible portion may or may not extend along the entire joining width of the stiff portions, i.e. in the entire space which extends between the ends (in particular the end surfaces that oppose each other when extended) of the stiff portions to be connected. The joining width is the dimension considered in the direction corresponding to the theoretical axis of pivoting of the hinge formed by each flexible portion. Thus, according to one embodiment, a device according to the invention comprises a flexible portion which extends continuously according to the entire said joining width of the said stiff portions. As a variant, a device according to the invention comprises a plurality of distinct flexible portions separated from one another, which are distributed along the joining width between the said stiff portions, and are separated from one another; the width (dimension parallel to the theoretical axis of pivoting of the hinge) of each flexible portion being smaller than the said joining width.

It should be noted that each flexible portion must be designed to be able to form a hinge between the two stiff portions, which presupposes in particular appropriate dimensions and forms of this flexible portion, according to the dimensions and forms of the ends that oppose each other of the stiff portions. In particular, each flexible portion must permit the passage, between the two stiff portions, of a plane containing the said theoretical axis of pivoting. Thus, the ends that oppose each other of the two stiff portions must be spaced from one another, in particular by each flexible portion, by a distance which is sufficient to permit the flexure of each flexible portion, in particular in order to permit the passage of a plane containing the said theoretic axis of pivoting, between these two ends.

In addition, advantageously, a device according to the invention is also characterized in that at least one flexible portion extends along only part of the thickness and/or the said joining width of the said stiff portions, and in that the said stiff portions are extended towards one another according to at least one other part of this thickness and/or this joining width, such as to have end surfaces which oppose each other when extended, wherein the stiff portions and each flexible portion are the extension of one another, and can thus withstand a compression force which passes through the hinge. Thus, the device according to the invention has improved longitudinal compression characteristics when extended.

As a variant or in combination, a device according to the invention advantageously comprises mountings which are added as additional thickness onto each stiff portion (for example by being glued or molded (separately or simultaneously with the stiff portions), or fused with the matrix of the stiff portions), the said mountings being disposed such as to have surfaces which come into contact with each other, and in particular end surfaces which oppose each other when extended, which can act as abutments which make it possible to transmit longitudinal compression and/or torsion forces through the unfolded hinge, and/or which limit in one direction the angular amplitude of extension of the hinge thus formed.

In a device according to the invention, the stiff portions and each flexible portion can have forms and dimensions which are extremely diverse, and almost without limitation, since the connection between the stiff portions can be formed by each connection layer and by each flexible portion, as previously stated. Preferably, each flexible portion is made of a homogeneous block of flexible composite material which is interposed between the two stiff portions, with the assembly forming a single monolithic piece. In the case in which a plurality of flexible portions are provided between two stiff portions, these flexible portions can be made of the same flexible composite material, and in particular with the same flexible matrix, or on the other hand they can be made of different flexible composite materials, in particular with different flexible matrices.

According to one embodiment, advantageously and according to the invention, each stiff portion is in the general form of a strip, and each flexible portion is also in the general form of a strip. These can be flat strips (plates or small plates), or on the other hand strips which are more or less crooked or curved, of the "carpenter's joint" type. For example, according to one embodiment, the stiff portions are curved in the same direction around an axis which is substantially at right-angles to the theoretical axis of pivoting of the hinge formed by each flexible portion. Thus, advantageously, according to one embodiment of the invention, each stiff portion is in the general form of a spring strip which is curved according to a longitudinal axis (i.e. such as to form a device of the "carpenter's joint" type), and each flexible portion is also in the general form of a strip which is curved according to the same axis.

Furthermore, the two stiff portions can be identical or non-identical, made of the same stiff composite material, or on the other hand each can be made of a stiff composite material, the two stiff composite materials being different. In a device according to the invention, the strips which constitute the stiff portions can be flexible transversely, i.e. around their longitudinal axis at right-angles to the theoretical axis of pivoting of the hinge thus formed. In other words, the stiff portions can be more flexible in flexure around this longitudinal axis, than in flexure on the plane which contains this longitudinal axis.

A device according to the invention can be made of any mechanical structure which incorporates at least one hinge which is built in between two stiff portions of composite material(s), or it can be integrated in a structure of this type, or in a more complex assembly. It can for example be an extendable mast of a space system which is folded back on the ground, and can be extended resiliently after being launched into space; or it can be a part of the structure of a land, sea, air or space vehicle (for example in order to form a hinge for a leaf or cover made of composite material), or it can be for furniture or other domestic equipment or systems, or for sport or leisure; or it can be for packaging made of composite material; or for any other structure. The stiff portions can be built into any more complex structure or assembly (honeycomb panels, ribbed panels, etc.).

The invention also relates to a device which is characterized in combination by all or some of the characteristics described previously or hereinafter.

Other objects, characteristics and advantages of the invention will become apparent from reading the following description which refers to the attached figures, which represent by way of non-limiting example different embodiments of the invention, and in which:

FIG. 1a is a schematic view in longitudinal cross-section of a device according to a first embodiment of the invention, in the extended state:

FIG. 1b is a schematic view similar to FIG. 1a, representing the device in the folded-back state;

FIG. 1c is a schematic plan view of the device according to the first embodiment of the invention;

FIG. 2b is a schematic view in longitudinal cross-section according to the line II-II in FIG. 2a;

FIG. 3a is a schematic view in longitudinal cross-section of a device according to a third embodiment of the invention, in the extended state;

FIG. 3b is a schematic view similar to FIG. 3a, representing the device in the folded-back state;

FIG. 3c is a schematic plan view of the device according to the third embodiment of the invention;

FIG. 3d is a schematic view from below of the device according to the third embodiment of the invention;

Figure 2A:
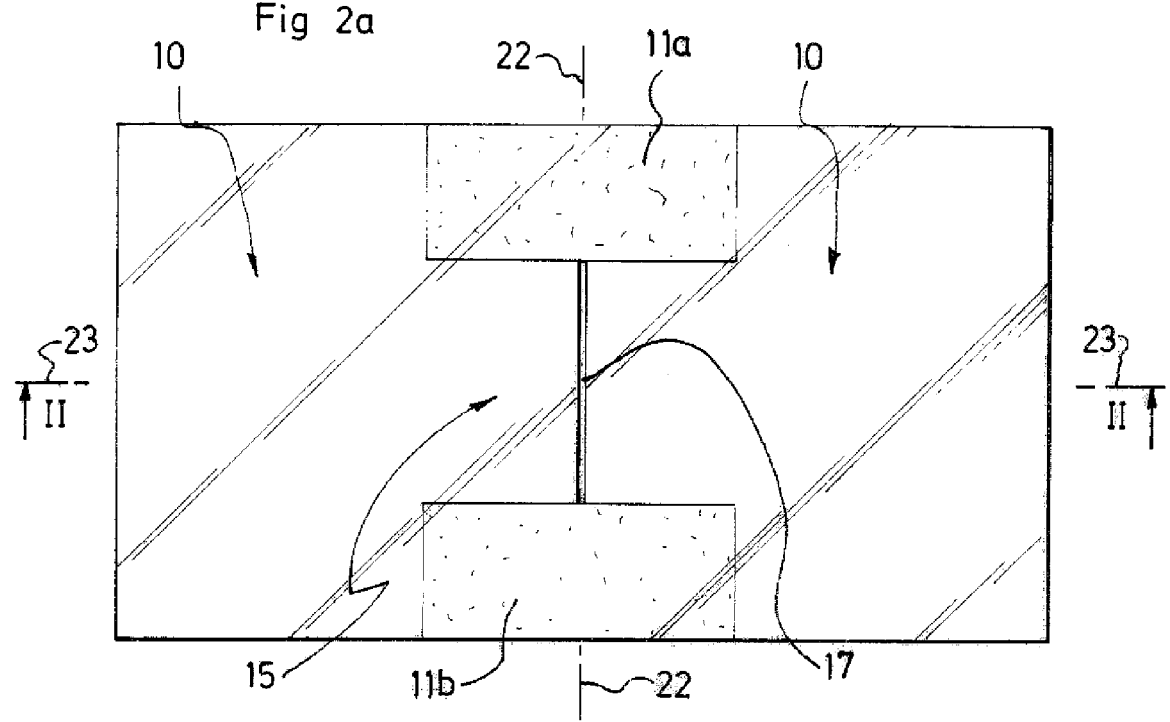
FIG. 2a is a schematic plan view of a device according to a second embodiment of the invention.

In the first embodiment of the invention represented in FIGS. 1a to 1c, the device according to the invention comprises two stiff small plates 10 which are made of stiff composite material, and each have an end surface which is oriented towards the other small plate 10, with the end surfaces which oppose the two small plates being connected by a more flexible portion 11 made of flexible composite material which forms a hinge between the two small plates 10, and connects the latter. In the examples represented, the end surfaces which oppose the small plates 10 are flat surfaces which are parallel to one another. The invention applies equally well to formation of a flexible hinge between two stiff parts with ends that oppose each other and have different forms, which are more or less complex, and the forms and dimensions of the flexible portion which connects them must be designed to make it possible to form a flexible hinge, in particular in order to permit pivoting in flexure around a theoretical axis of pivoting which is interposed between the two ends of the stiff parts. The ends of the small plates 10 which are connected by the flexible portion 11 must be spaced from one another by a distance which is sufficient to permit the passage of the said theoretical axis of pivoting, such as to allow the flexure of the flexible portion 11. This applies all the more if these ends that oppose one another have distorted forms.

The stiff composite material which forms each small plate 10 comprises a reinforcement structure 12, which, in the example represented, comprises a plurality of layers which are parallel to one another and to the main plane of the small plate, and are spaced from one another and embedded in a matrix 14. These are for example layers of synthetic fibers, in particular carbon fibers, which are woven or non-woven, or simply deposited in parallel adjacent strips, sheets or bundles, which are or are not impregnated. In any case, the reinforcement structure 12 comprises at least one series of fibers, or other items which are resistant in traction, which extend continuously longitudinally, and in an uninterrupted manner, between the two small plates 10 and in the flexible portion 11.

In the first embodiment represented, each of the layers of the reinforcement structure 12 of each small plate 10 is extended within the flexible portion 11, and thus constitutes a connection layer 13 between the two small plates 10, with the reinforcement structure 12 also forming the reinforcing armature of the flexible portion 11. Reciprocally, the reinforcing armature of the flexible composite material which constitutes the flexible portion 11 is constituted only by the reinforcement structure 12.

Thus, in the device according to the invention, the reinforcement 12 for the composite materials which constitute respectively the two stiff small plates 10 and the flexible portion 11, makes it possible to connect the two small plates 10 to one another, and makes it possible to connect the flexible portion 11 to each of the two small plates 10, thus making it possible to guarantee simply and reliably the resistance to traction of the hinge thus formed, and also facilitating and speeding up the manufacture of the hinge. In fact, in a device of this type, since the reinforcement is common to the small plates 10 and the flexible portion 11, all of these different portions can be manufactured simultaneously.

On the other hand, the stiff composite material which forms the small plates 10 (and which can be the same for the two small plates 10, or on the other hand different from one small plate to the other), is different from the flexible composite material which forms the flexible portion 11, and these stiff and flexible composite materials differ in the form of the matrix within which the reinforcement 12, 13 extends. The matrix 14 of each stiff composite material which constitutes a small plate 10 is stiffer than the matrix 19 of the flexible composite material which constitutes the flexible portion 11. The matrix 19 of the flexible composite material is also selected such as to provide the flexible portion 11 with the properties of flexibility in flexure which are required. The matrix 14 of the stiff composite material is, for its part, selected according to the mechanical properties which are required for the small plates 10, depending on their application. In addition, these two matrices 14, 19 are selected such as to be compatible with one another, at least during the manufacture of the device according to the invention. Preferably, the two matrices 14, 19 belong to the same chemical family, so that they can be produced by similar manufacturing methods.

For example, the matrix 14 of each stiff composite material is selected from amongst the thermoplastic polymers, i.e.: polyethylenes, polystyrenes, ketone polyethers; or heat-setting polymers: i.e. polyester resins, epoxy resins, phenolic resins, polyimide resins, ester cyanate resins and melamine resins; and the matrix 19 of the flexible composite material is selected from amongst natural rubbers, silicone elastomers, polyurethane elastomers, polychloroprene elastomers, polyethylenes, polystyrenes, resins, resins filled with magnetic particles, or synthetic foams.

In addition, in the first embodiment represented, the small plates 10 and the flexible portion 11 are formed with the same thickness and with the same width. Thus, the width of the flexible portion 11 extends along the entire width of the small plates 10, the two small plates 10 themselves having the same width. In addition, the thickness of the device according to the invention is substantially constant in the extended state.

The mechanical characteristics of the reinforcement 12, 13 and of the matrix 19 of the flexible composite material are selected such as to permit the functioning of the hinge thus formed as represented in FIG. 1b, i.e. by permitting flexure which, in the example represented, is 180°.

Figure 2B:
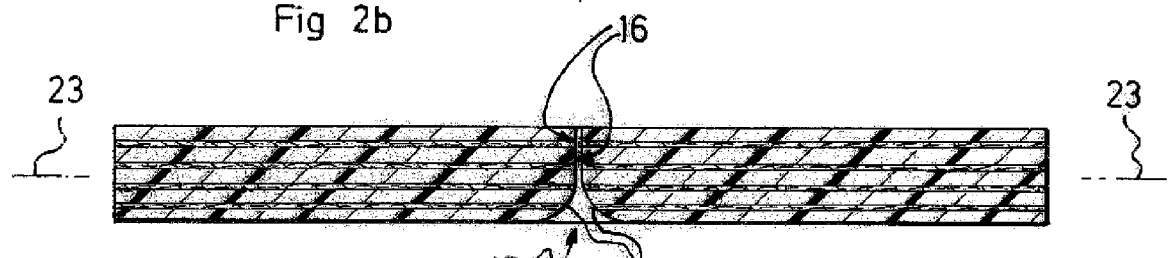

The second embodiment differs from the first, firstly in that the small plates 10 are both curved in the same direction around a longitudinal axis 23 which is substantially at right-angles to the theoretical axis of pivoting 22 of the hinge formed between the plates, such as to form a device of the so-called "carpenter's joint" type, and secondly in that the hinge is formed not by a single flexible portion, but by a plurality of lateral flexible portions which are separated from one another—in particular, in the example represented, two end lateral flexible portions 11a, 11b which are separated from one another—by a median portion 15 in which the small plates 10 are extended towards one another, such as to have end surfaces 16 which extend transversely, and oppose each other when extended (wherein the small plates 10 and the flexible portions 11a, 11b are in the longitudinal extension of one another, the hinge being unfolded as represented in FIGS. 2a and 2b).

Figure 2C:
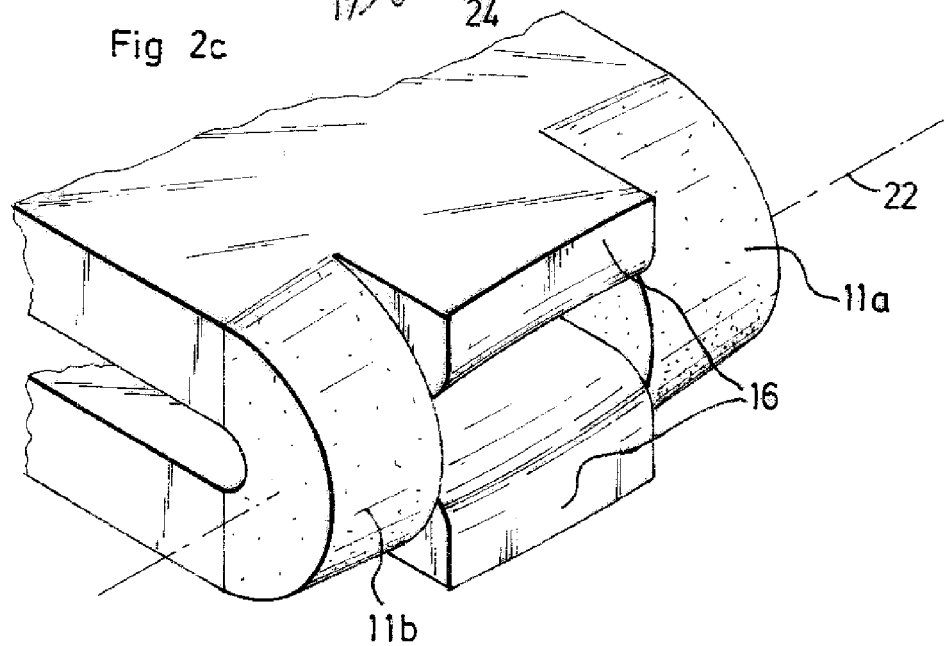
FIG. 2c is a schematic perspective view representing the device in the folded-back state.
Figure 2D:
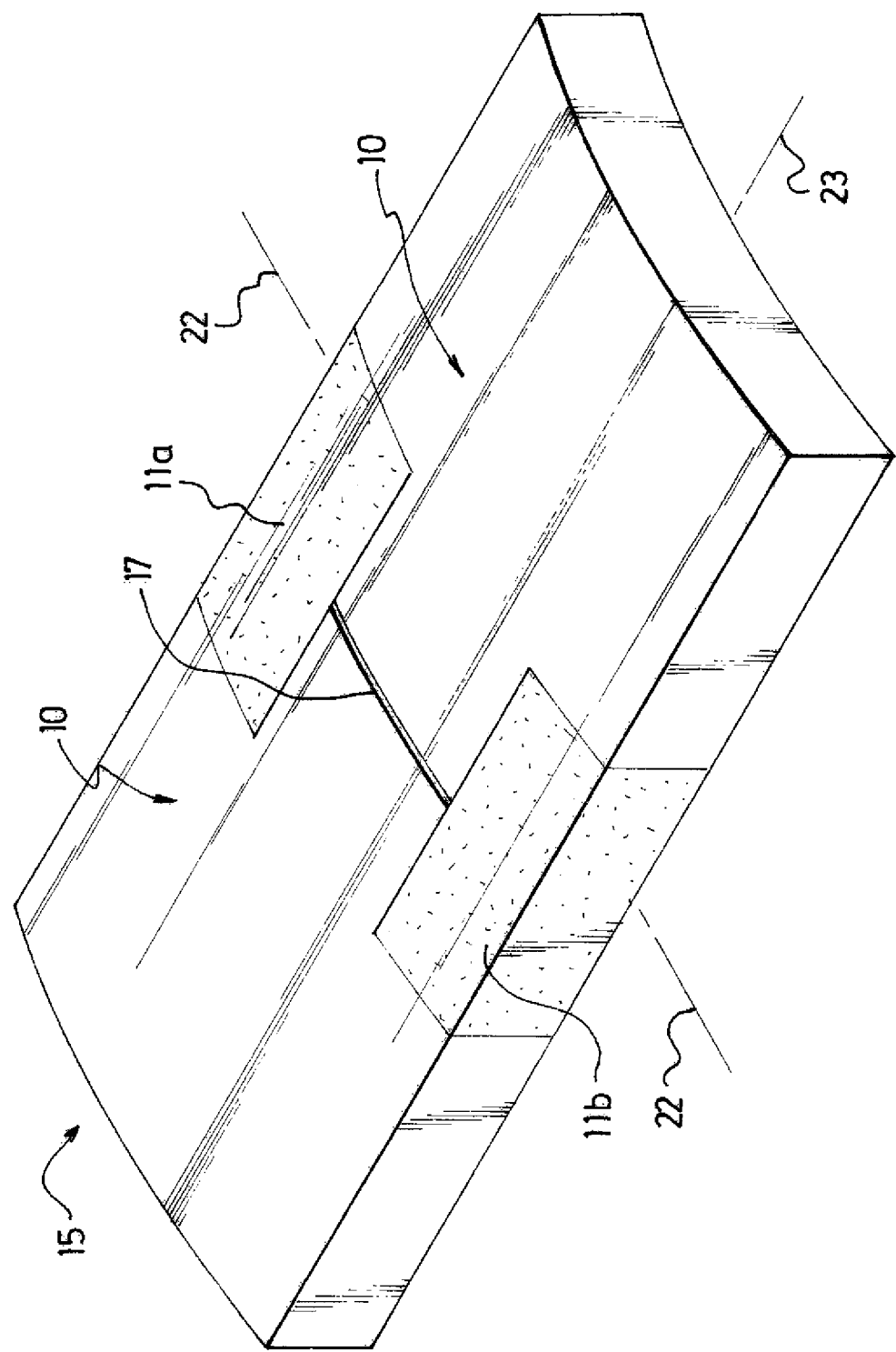
FIG. 2d is a schematic perspective view representing the device in the extended state.

The slight curvature of the small plates 10 and of the flexible portions 11a, 11b can be seen in FIGS. 2c and 2d. The invention thus makes it possible to obtain a hinge which is flexible around the longitudinal axis 23 of the small plates 10, i.e. on a flexure plane which contains the theoretical axis of pivoting 22, and does not pass via the small plates 10 (perpendicular to the longitudinal axis 23 of the small plates 10, when this longitudinal axis 23 exists), and is therefore compatible with this transverse flexibility of the small plates 10. The device according to the invention thus makes it possible to produce reliably, and in a manner which is compatible with a space environment, a structure with spontaneous resilient extension of the "carpenter's joint" type. It should also be noted that the device according to the invention has a small dimension, in particular with a small radius of curvature of the flexible portion in the folded state, and a folding angle which can be small (down to 0°). The invention also makes it possible to control and minimize the flexure stresses of the hinge thus formed. Also, a device according to the invention makes it possible to transmit torsion forces in the folded state of the hinge, around an axis which is at least substantially at right-angles to the plane of the small plates 10. This rigidity in torsion in the folded state makes it possible to stabilize the device, particularly when launching a space system in which it is incorporated (for example solar panels which are folded back in an accordion fashion).

The two flexible portions 11a, 11b of lateral ends are made of a flexible composite material which is also designed to allow them to be subjected not only to the flexure deformation corresponding to the folding and unfolding of the hinge, but also to a slight flexure deformation of the theoretical axis of pivoting of the hinge, which is imposed by the slightly curved form of the small plates 10, during the folding of the hinge thus formed. The plurality of flexible portions 11a, 11b which are interposed between the two small plates 10 facilitate this slight deformation.

In addition, the extension of the small plates 10 into the median portion 15 between the flexible portions 11a, 11b which form the end surfaces 16 are normally separated by a slit 17 with a narrow width, when the device is in the extended state. The end surfaces 16 serve as a longitudinal axial abutment, which in particular allows the device according to the invention to withstand any longitudinal compression stresses, as well as torsion moment on the axis at right-angles to the small plates, and to transmit such stresses. The end surfaces 16 are however designed to permit pivoting of the hinge by flexure of the flexible portions 11a and 11b. For this purpose, as represented in FIG. 2b, they have for example rounded edges 24 on the side according to the direction of pivoting required. As a variant, not represented, there is nothing to prevent creation of end surfaces 16 which are entirely hemi-cylindrical, and can roll on one another during the folding of the hinge, in order to permit pivoting in both directions. Also, according to another variant not represented, there is nothing to prevent creation of end surfaces 16 which are entirely flat, but which are spaced from one another sufficiently to avoid impeding the pivoting, whilst providing a longitudinal axial abutment starting from a certain axial compression deformation of the flexible portions 11a, 11b, thus making it possible to eliminate the play between the end surfaces 16.

It will be appreciated that this second embodiment can itself form the basis of numerous variants as far as the number and arrangement of the flexible portions is concerned. For example, it is possible to provide a single median flexible portion which is interposed between two lateral extensions of the stiff portions.

The third embodiment which is represented in FIGS. 3a to 3d differs from the first embodiment in that the flexible portion 11 which forms a hinge between the two small plates 10 does not extend through the entire thickness of the small plates 10, but only on a part of this thickness, starting from one of the main surfaces of the small plates 10. On the other part of the thickness of the small plates 10, the latter are extended such as to form also end surfaces 20 which extend transversely, and oppose each other when extended, such as to serve as a longitudinal compression abutment. The end surfaces 20 extend according to the entire width of the small plates 10, and also make it possible to block the device according to the invention in the extended state, whilst preventing the folding back of the hinge in one direction, and permitting the folding back of the hinge only in the other direction, as represented in FIG. 3b. In the extended state, the device also has a thickness which is substantially constant between the two small plates 10 and at the hinge thus formed. As can be seen in FIGS. 3a and 3b, in this embodiment, only part of the layers which form the reinforcement structure 12 of the small plates 10 is extended into the flexible portion 11 and between the two small plates 10, such as to serve as connection layers between these different portions 10, 11. The layers of the reinforcement structure 12 in the thick part corresponding to the end surfaces 20 are on the other hand interrupted, and the matrix 14 of the small plates 10 is extended as far as each of the end surfaces 20. The matrix 19 of the flexible composite material which constitutes the flexible portion 11 extends only on a part of the thickness opposite the small plates 10.

Figure 4A:
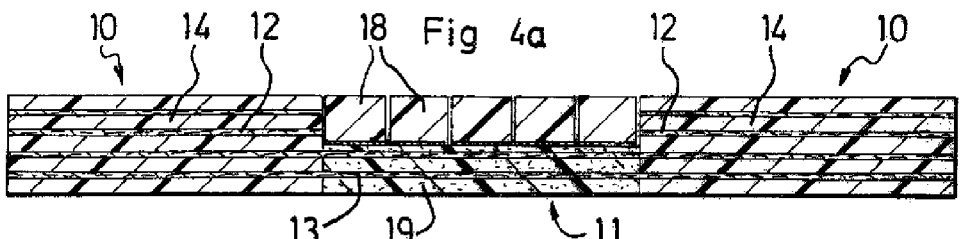
FIG. 4a is a schematic view in longitudinal cross-section of a device according to a fourth embodiment of the invention, in the extended state.
Figure 4B:
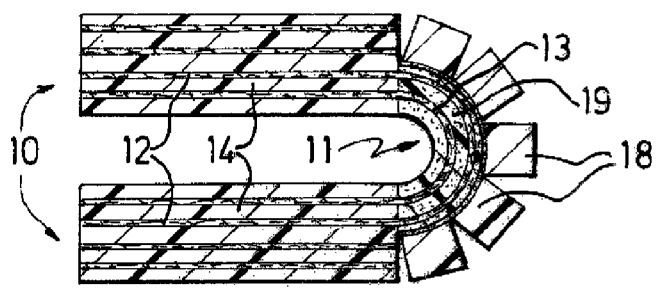
FIG. 4b is a schematic view similar to FIG. 4a, representing the device in the folded-back state.
Figure 4C:
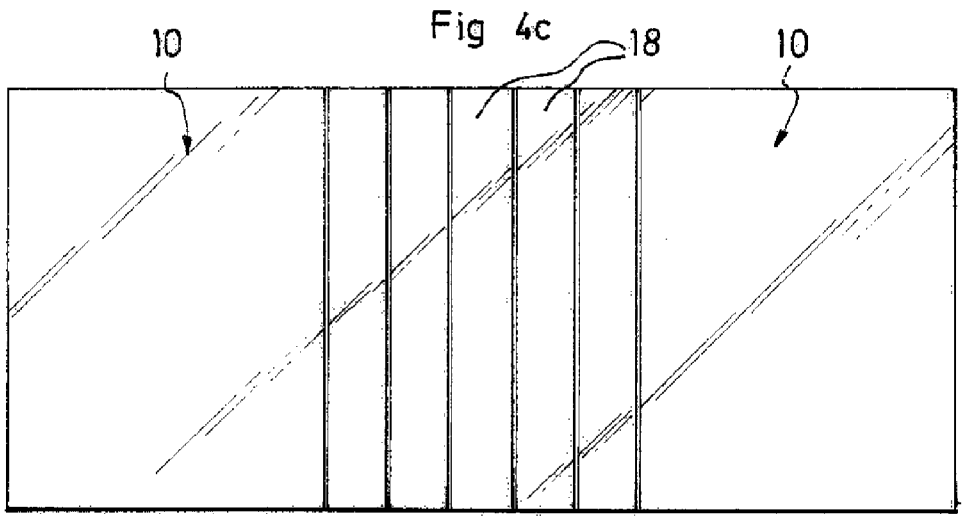
FIG. 4c is a schematic plan view of the device according to the fourth embodiment of the invention.
Figure 4D:
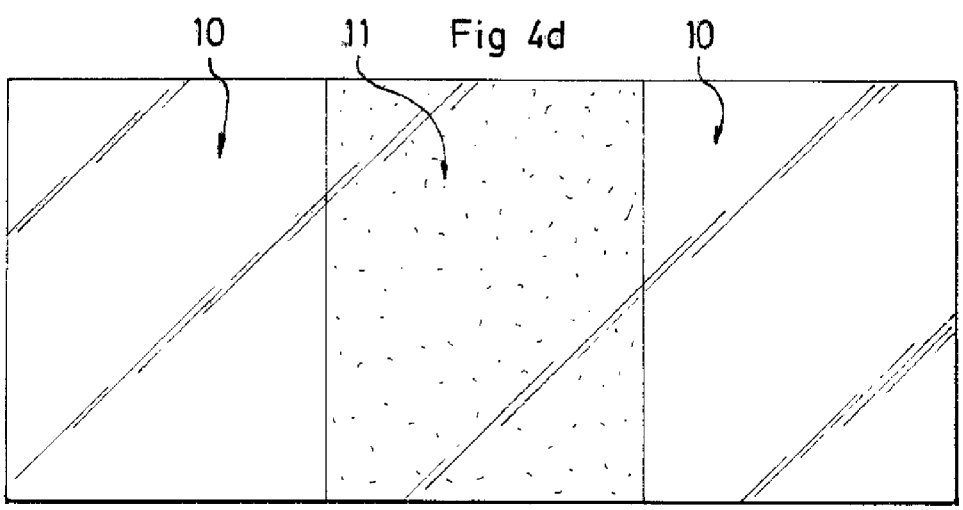
FIG. 4d is a schematic view from below of the device according to the fourth embodiment of the invention.

The fourth embodiment which is represented in FIGS. 4a to 4d differs from the third embodiment in that the extensions which form the opposite end surfaces 20 when extended are replaced by a plurality of wedges 18 which are superimposed on the flexible portion 11, and are glued to the latter in order to complete the thickness between the small plates 10, the different wedges 18 being juxtaposed with one another such as to serve as a longitudinal compression abutment when extended (FIGS. 4a and 4c). The wedges 18 extend according to the width of the small plates 10 parallel to one another, and also make it possible to block the device according to the invention when extended, by preventing the folding back of the hinge in one direction, and permitting the folding back of the hinge only in the other direction, as represented in FIG. 4b. The wedges 18 can be made of any materials which are stiff in compression, for example of the same material as the matrix 14 of the stiff composite material which constitutes at least one of the small plates 10.

Figure 5A:
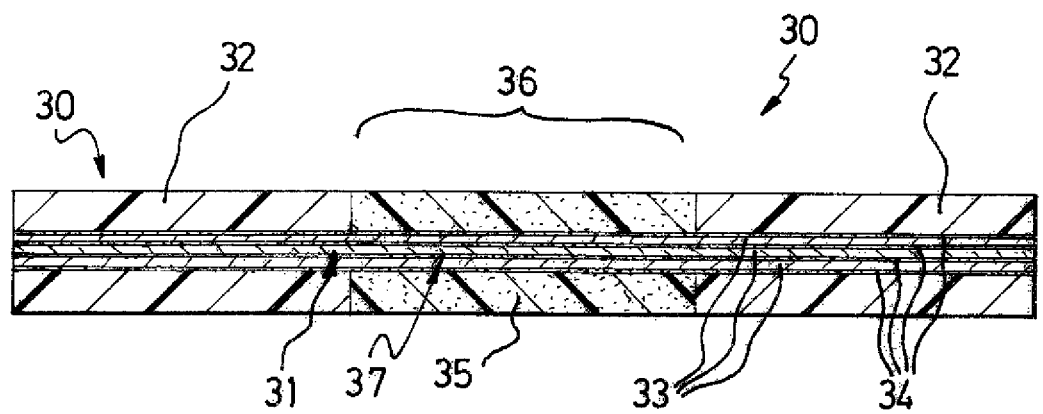
FIG. 5a is a schematic view in longitudinal cross-section of a device according to a fifth embodiment of the invention, in the extended state.
Figure 5B:
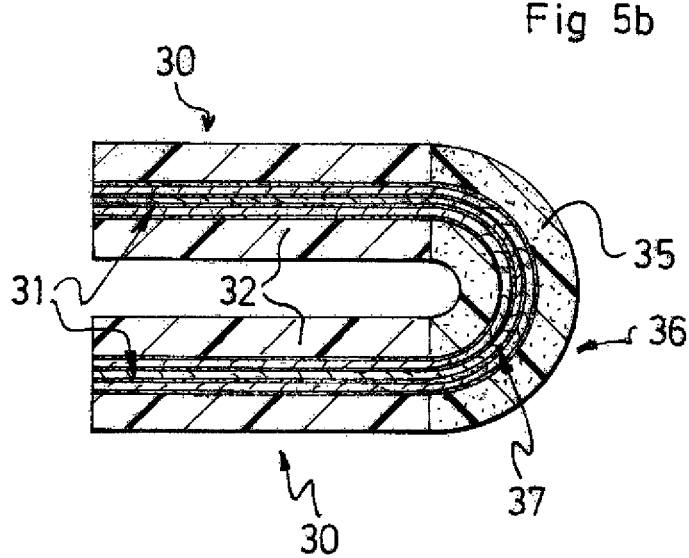
FIG. 5b is a schematic view similar to FIG. 5a, representing the device in the folded-back state.

In the fifth embodiment which is represented in FIGS. 5a and 5b, the device according to the invention comprises two small plates 30, which are each formed by a composite material of the "complex" type (multiple layer), comprising a multiple layer metal core 31 which serves as a reinforcement structure incorporated between two thicknesses of a film (which itself is multiple-layer or in a single layer) of polymer material 32 which serves as a matrix 32 for the stiff small plates 30. The metal core 31 of the small plates 30 is itself made of a plurality of metal sheets 33 which are glued to one another by films of glue 34. The film 32 is glued onto the metal core 31 on each of its main surfaces. The film 32 is preferably identical on each surface, but in practice there is nothing to prevent two thickness of polymer film of different types from being provided.

The metal sheets 33 which form the core 31 preferably have a thickness which is limited to a few microns or tens of microns, and can be made of ductile metals with great deformation such as gold, platinum, silver, copper, aluminum, lead, tin, nickel, or their alloys.

The polymer film 32 which forms the matrix which is necessary for the stability in compression and the chemical protection of the core 31 is made of a polymer material which can be selected from amongst the polymers which are used for the production of complex materials, in particular from the group comprising: polyamides which are or are not aromatic, polyimides (Kapton®) which are or are not aromatic, polyesters, polyethylenes, PBO: poly(benzoxazole), poly(arylene ether benzimidazole) (TOR), polypropylenes, polyurethanes, and PVC (polyvinyl chloride).

The film 32 can be the same as that for production of the two small plates 30, or on the other hand it can be different from one small plate 30 to the other, or with a different thickness from one small plate 30 to the other. Preferably, the two small plates 30 have substantially the same thickness.

Between the two small plates 30 thus formed, the portion 37 of the metal core 31 which connects the two small plates 30 and serves as a connection layer between the small plates 30 can be left free (variant not represented), the flexible portion then being constituted only by this metal core 31, and being without a matrix. In the variant which is represented in FIGS. 5a and 5b, the portion 37 of the metal core 31 is covered on each of its main surfaces with at least one layer of a film 35, which is multiple-layer or in a single layer, and is more flexible than the thickness of the polymer film 32 of the small plates 30, such as to form a flexible portion 36 which forms a hinge, this flexible portion 36 thus being formed by a flexible composite material of the "complex" type (multiple layer), comprising the portion 37 of the metal core 31 as a connection layer for the reinforcing armature of this composite material, and, on each side, at least one layer of polymer film 35 which is different from the complex substance 32, as a more flexible matrix. For example, the more flexible polymer film 35 can be selected from amongst the aforementioned materials as far as the film 32 is concerned, but from their variant embodiments which make it possible to obtain greater flexibility for the film 35.

Figure 6A:
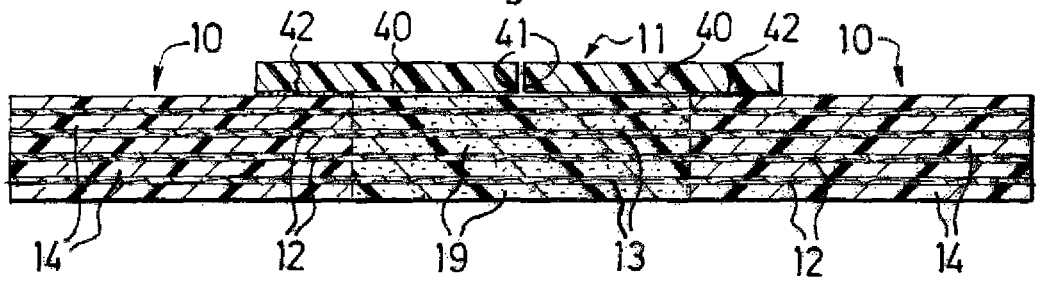
FIGS. 6a, 6b and 6c are similar to FIGS. 1a, 1b and 1c respectively, and represent a sixth embodiment of the invention in which the device is provided with added-on small plates.
Figure 6B:
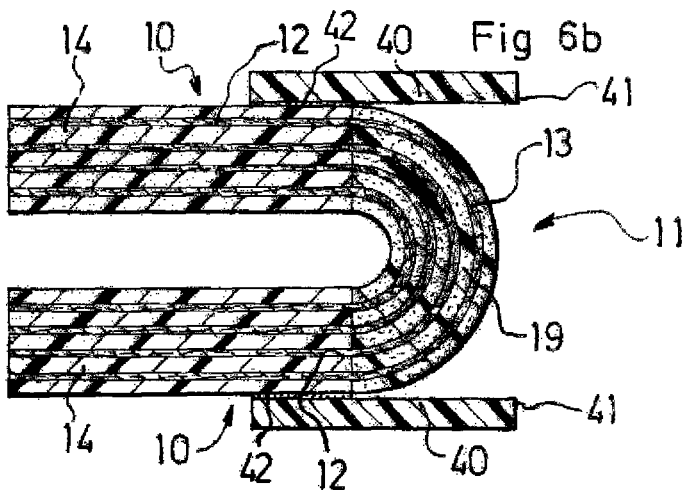
Figure 6C:
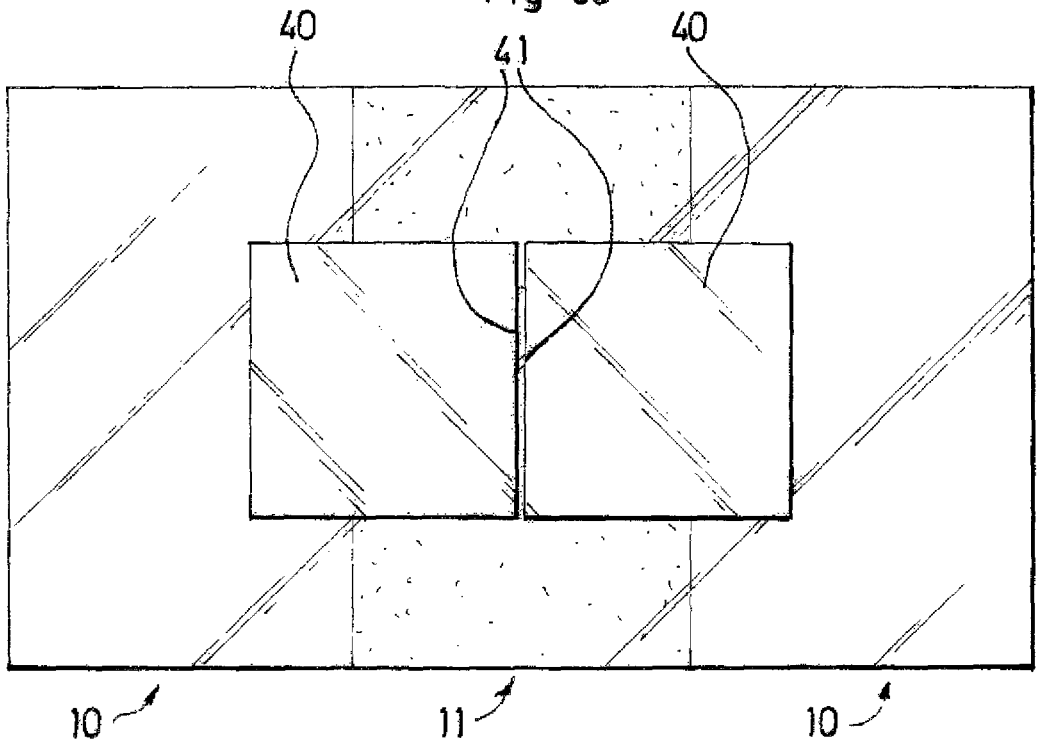

The sixth embodiment which is represented in FIGS. 6a, 6b and 6c is similar to the first embodiment, and differs from it only in that mountings 40 are added by being glued onto the small plates 10, on a main surface of the latter, such as to form abutments which make it possible to transmit longitudinal compression and/or torsion forces via the unfolded hinge, and/or by limiting the angular amplitude of deformation of the hinge thus formed, in one direction. In the example represented, the mountings 40 are constituted by stiff plates which are glued by means of a layer of glue 42 onto the end edges of the small plates 10, and these mountings 40 extend opposite the flexible portion 11 over a certain distance, such as to have end surfaces 41 that oppose each other, and come into contact with one another starting from a certain amplitude of extension of the hinge. In the example represented, the mountings 40 are designed to block the hinge in the extended position in which the small plates 10 are substantially in the extension of one another, the angle formed by the hinge being approximately 180°. There is nothing to prevent other arrangements, for example mountings 40 which permit blocking of the hinge at 120° (with the small plates 10 oriented at 120° from one another). In addition, in the example represented, the mountings 40 extend over only a median portion of the joining width. There is nothing to prevent these mountings 40 from extending over the entire joining width, or even a plurality of distinct mountings 40 which are separated from one another and are distributed along the joining width. In addition, the mountings 40 can be added on not by gluing but by welding or fusion, or by simultaneous molding with the small plates 10, or by molding which is carried out subsequently on the small plates 10. The mountings 40 can themselves be constituted by a stiff composite material, or by a piece of stiff polymer material (for example PMMA or the like).

The invention can form the basis of numerous variant embodiments in comparison with the different embodiments which are represented in the figures, and have been described above solely by way of examples, which can moreover be combined entirely or partly. For example, it is possible to provide heterogeneous reinforcement structures and/or reinforcing armatures, i.e. which are made of a plurality of layers or other different elements, for example one or a plurality of layer(s) of woven fibers, one of a plurality of metal multiple layer thickness(es), or one or a plurality of sheet(s) of fibers, etc. Similarly, the matrices which form the composite materials can be heterogeneous within the thickness and/or the width of the stiff and flexible portions. The reinforcing armature of each flexible portion which forms a hinge can have specific reinforcing armature elements which are particular to it, as a supplement to each connection layer which is formed by a layer of the reinforcement structure of the stiff portions which are connected by this flexible portion. The thickness of each stiff portion and that of each flexible portion is not necessarily the same, and all variant embodiments imaginable are possible. The two stiff portions to be connected are not necessarily strictly identical, but on the contrary can vary in both their forms and dimensions, etc. There is also nothing to prevent the addition, as added-on parts, of mountings onto one and/or the other of the main surfaces of the stiff small plates 10, 30, and/or of the flexible portions 11, 36, in order to provide the device with additional properties. For example, there is nothing to prevent the provision of alloy mountings with form memory, or mountings which form abutments which limit the angular extension of the hinge. Similarly, there is nothing to prevent mountings of this type being integrated in the thickness of the small plates 10, 30, and/or of each flexible portion 11, 36, etc. In all the embodiments, the small plates 10, 30 can be curved (tiled) in the same direction (or in the opposite direction) around a longitudinal axis which is substantially at right-angles to the theoretical axis of pivoting of the hinge, as in the above-described second embodiment. Also, the ends of the small plates which are connected by each flexible portion are not necessarily flat end surfaces which are parallel to one another, as in the embodiments represented, but can have different, more distorted forms. For example, the two ends of the small plates which are connected by each flexible portion do not necessarily have the same form, or, strictly speaking, the same dimensions. The two ends that oppose each other of the small plates which are connected by each flexible portion must however be spaced from one another by a distance which is sufficient to permit the flexure of each flexible portion.

The invention can also form the basis of a very large number of different applications in order to provide a friction-free reliable flexible hinge at a lower cost. In particular, a device according to the invention can advantageously be applied to provide a structure which can be unfolded (extended) or refolded (retracted) on a space system, for example a mast which can be extended after being launched.

The invention claimed is:

1. A device comprising:
    at least one flexible portion between two stiff portions, which are stiffer than said at least one flexible portion, each of said two stiff portions being made of stiff composite material, said at least one flexible portion connecting said two stiff portions and forming a flexible hinge between said two stiff portions,
    each of said two stiff portions comprising,
        at least one reinforcement structure of said stiff composite material, said at least one reinforcement structure being able to impart resistance to said stiff composite material at least in longitudinal traction, and
        a first matrix within which said at least one reinforcement structure extends,
    said at least one flexible portion being formed by at least one flexible material selected from the group of flexible composite materials comprising,
        a reinforcing armature comprising at least one connection layer of said reinforcement structure which is common to said stiff composite material, each said at least one connection layer extending continuously and in common between said two stiff portions and being flexible, and
        a second matrix within which said reinforcing armature extends, said second matrix being more flexible in flexure than said first matrix of the stiff composite material;
    wherein,
    said two stiff portions have end surfaces that oppose each other when said device is in an extended state, where the stiff portions and said at least one flexible portion are in a longitudinal extension of one another,
    said at least one flexible portion axially compressing under longitudinal compression forces in the extended state,
    said end surfaces of said stiff portions being arranged in the extended state to come into flat surface contact with each other and at a neutral longitudinal axis of the device after axial compression deformation of said at least one flexible portion so that said end surfaces act as abutments transmitting the longitudinal compression forces at least along said neutral longitudinal axis and torsion forces, and
    said end surfaces being arranged to enable the flexible hinge thus formed to fold back, at least in a direction away from the extended state.

2. Device as claimed in claim 1, comprising at least one connection layer which is resistant in traction, and extends longitudinally, continuously and in an uninterrupted manner within said two stiff portions and said at least one flexible portion.

3. Device as claimed in claim 2, wherein said at least one connection layer is selected from the group formed by monofilaments, cables, bundles, fabrics, non-woven fabrics, strips, sheets, mats and leaves, and complex multiple layers.

4. Device as claimed in claim 2, wherein said at least one connection layer is selected from the group formed by sheets of woven synthetic fibers, sheets of non-woven synthetic fibers, mats, sheets of woven synthetic strips, sheets of non-woven synthetic strips, leaves of synthetic materials, leaves of metal materials, and multiple-layer complex substances comprising a plurality of layers, with each layer being one of these materials.

5. Device as claimed in claim 2, wherein said at least one connection layer is composed of synthetic fibers selected from the group formed by glass fibers; carbon fibers; metal fibers, metal whiskers; boron fibers; beryllium fibers; ceramic fibers; asbestos fibers; cellulose fibers; polymer fibers; and their mixtures.

6. Device as claimed in claim 1, wherein said two stiff portions and said at least one flexible portion have similar thicknesses.

7. Device as claimed in claim 1, wherein only a part of the reinforcement structure of said two stiff portions extends continuously between the two stiff portions, the other part of the reinforcement structure of said two stiff portions being interrupted between the two stiff portions.

8. Device as claimed in claim 1, wherein the reinforcing armature of the flexible material is constituted only by at least one said connection layer.

9. Device as claimed in claim 1, wherein the matrix of said flexible composite material is formed by a material selected from the group formed by natural rubbers (NR); elastomers; polyethylene resins; polystyrene resins; polyethylene foams; polystyrene foams.

10. Device as claimed in claim 9, wherein the matrix of the said flexible composite material is formed by an elastomer selected from the following group: polyacrylate (ACM), polyesterurethane (AU), bromobutyl rubber (BIIR), polybutadiene (BR), chlorobutyl rubber (CIIR), chlorinated polyethylene (CM), homopolymer of epichlorhydrine (CO), copolymer of polyesteramide (CPA), copolymer of polyesterglycol (CPE), polychloroprene (CR), chlorosulphonated polyethylene (CSM), copolymer of ethylene and methyl acrylate (EAM), copolymer of epichlorhydrine and ethylene oxide (ECO), terpolymer of propylene ethylene and a diene (EPDM), copolymer of ethylene and propylene (EPM), polyetherurethane (EU), copolymer of ethylene and vinyl acetate (EVM or EVA), fluorocarbonated elastomers (FKM and FPM), silicone with methyl and fluorinated groups (FVMQ), copolymer of butadiene and hydrogenated acrylonitrile (H-NBR), butyl rubber (IIR), synthetic polyisoprene (IR), methylsilicone (MQ), copolymer of butadiene and acrylonitrile (NBR), polyether of ethyleneglycol and an acid (OT), methylphenylsilicone (PMQ), polydichlorophosphazenes with substitution of fluorinated groups (PNF), polynorbornene (PNR), polyurethanes (PUR), methylsilicone with phenyl and vinyl groups (PVMQ), silicone rubbers (Q), copolymer of styrene and butadiene (SBR), copolymer-blocks of styrene-butadiene-styrene (SBS), copolymer-blocks of styrene-ethylene-butene (or butylene)-styrene (SEBS), copolymer-blocks of styrene-isoprene-styrene (SIS), synthetic rubbers (SR), polysulphides (TM or T), thermoplastic rubbers (TPE), thermoplastic elastomers derived from polyolefins (TPO), thermoplastic polyurethanes (TPU), methylsilicone with vinyl groups (VMQ), halogenated butyl rubber (XIIR), carboxylated nitrile rubber (XNBR).

11. Device as claimed in claim 1, wherein the matrix of said flexible composite material is a multiple layer complex substance selected from the group comprising: polyolefins, acrylics, polyamides which are or are not aromatic, polyimides (Kapton) which are or are not aromatic, polyesters, PBO: poly(benzoxazole), poly(arylene ether benzimidazoles) (TOR), polyurethanes, PVC (polyvinyl chloride).

12. Device as claimed in claim 1, wherein said at least one flexible portion extends continuously an entire joining width of said two stiff portions.

13. Device as claimed in claim 1, comprising a plurality of distinct said flexible portions separated from one another, and which are distributed along a joining width between said two stiff portions.

14. Device as claimed in claim 1, wherein said end surfaces comprises mountings which are added as additional thickness onto each of said two stiff portions.

15. Device as claimed in claim 1, wherein each of said two stiff portions is a strip, and said at least one flexible portion is also a strip.

16. Device as claimed in claim 1, wherein each of said two stiff portions is a spring strip which is curved according to a longitudinal axis, and said at least one flexible portion is also a strip which is curved according to the same axis.

17. Device as claimed in claim 1, wherein said two stiff portions have similar thicknesses.

18. Device as claimed in claim 1, wherein said end surfaces that are in contact with each other in the extended state have parts that are planar.

* * * * *